US010913572B2

(12) United States Patent
Shaikh et al.

(10) Patent No.: US 10,913,572 B2
(45) Date of Patent: Feb. 9, 2021

(54) STORAGE SYSTEMS, METHODS AND CONTAINERS

(71) Applicant: OCADO INNOVATION LIMITED, Hatfield (GB)

(72) Inventors: Siddique Shaikh, Hatfield (GB); Martyn Lee Bates, Hatfield (GB); Andrew Selim, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 29 days.

(21) Appl. No.: 16/077,564

(22) PCT Filed: Jan. 31, 2017

(86) PCT No.: PCT/EP2017/051981
§ 371 (c)(1),
(2) Date: Aug. 13, 2018

(87) PCT Pub. No.: WO2017/137276
PCT Pub. Date: Aug. 17, 2017

(65) Prior Publication Data
US 2019/0031399 A1 Jan. 31, 2019

(30) Foreign Application Priority Data
Feb. 12, 2016 (GB) .................................. 1602505.8

(51) Int. Cl.
*B65D 21/02* (2006.01)
*B65D 25/14* (2006.01)
(Continued)

(52) U.S. Cl.
CPC ......... *B65D 21/0209* (2013.01); *B65D 25/14* (2013.01); *B65D 25/16* (2013.01); *B65G 1/0464* (2013.01); *B65D 2213/00* (2013.01)

(58) Field of Classification Search
CPC .......... B65D 25/14; B65D 2501/24554; B65D 21/0209
See application file for complete search history.

(56) References Cited

U.S. PATENT DOCUMENTS 2,701,065 A  2/1955  Bertel
3,744,193 A  7/1973  Lau
(Continued)

FOREIGN PATENT DOCUMENTS

CN  201942063 U  8/2011
CN  103723416 A  4/2014
(Continued)

OTHER PUBLICATIONS

British Examination Report dated Apr. 26, 2018, by the British Patent Office for Application No. 1701527.2.
(Continued)

*Primary Examiner* — Thomas Randazzo
(74) *Attorney, Agent, or Firm* — Buchanan Ingersoll & Rooney PC

(57) ABSTRACT

A storage system is described where goods are stored in containers and the containers are stored in stacks. Above the stacks runs a grid network of tracks on which load handling devices run. The load handling devices take containers from the stacks and deposit then at alternative locations in the stacks or deposit then at stations where goods may be picked out. The containers include liners formed from flame retardant or flame suppressant material. Containers with a liner are used to store ignitable items within the storage system.

20 Claims, 7 Drawing Sheets

(51) Int. Cl.
  *B65G 1/06* (2006.01)
  *B65G 1/04* (2006.01)
  *B65D 25/16* (2006.01)

(56) References Cited

U.S. PATENT DOCUMENTS

| | | | |
|---|---|---|---|
| 4,088,232 A | | 5/1978 | Lilly |
| 4,263,365 A | | 4/1981 | Burgess et al. |
| 4,561,554 A | | 12/1985 | Swincicki |
| 4,566,588 A | * | 1/1986 | Kataczynski ............ F42B 39/26 206/3 |
| 4,599,829 A | | 7/1986 | DiMartino, Sr. |
| 4,723,381 A | | 2/1988 | Straumsnes |
| 4,917,429 A | | 4/1990 | Giger |
| 4,973,219 A | | 11/1990 | Brickner et al. |
| 5,160,025 A | * | 11/1992 | Greenawald ............. B65D 5/56 206/204 |
| 5,427,308 A | * | 6/1995 | Swift ................... B65D 5/4612 229/114 |
| 5,758,973 A | * | 6/1998 | LaFleur ............. B65D 88/1612 383/121 |
| 6,152,287 A | | 11/2000 | Luria |
| 6,654,662 B1 | | 11/2003 | Hognaland |
| 8,408,863 B1 | | 4/2013 | Benedict et al. |
| 8,616,404 B1 | * | 12/2013 | Starck .................... B65D 85/84 220/592.25 |
| 8,628,289 B1 | | 1/2014 | Benedict et al. |
| 9,151,770 B2 | | 10/2015 | Reuteler |
| 9,422,108 B2 | * | 8/2016 | Hognaland .......... B65G 1/1371 |
| 9,682,822 B2 | | 6/2017 | Lindbo et al. |
| 9,796,080 B2 | | 10/2017 | Lindbo et al. |
| 9,845,208 B2 | | 12/2017 | Lindbo et al. |
| 10,000,337 B2 | | 6/2018 | Lindbo et al. |
| 2002/0057956 A1 | | 5/2002 | Jephcott |
| 2002/0064318 A1 | * | 5/2002 | Malone ............... B65D 81/3853 383/3 |
| 2003/0005626 A1 | | 1/2003 | Yoneda et al. |
| 2003/0141973 A1 | | 7/2003 | Yeh et al. |
| 2003/0156501 A1 | | 8/2003 | Spindel et al. |
| 2004/0016624 A1 | | 1/2004 | Jephcott |
| 2005/0035119 A1 | | 2/2005 | Hull et al. |
| 2005/0220573 A1 | | 10/2005 | Benedict et al. |
| 2006/0201377 A1 | | 9/2006 | Gielow |
| 2007/0016328 A1 | | 1/2007 | Ziegler et al. |
| 2007/0131684 A1 | | 6/2007 | Cirillo et al. |
| 2007/0251858 A1 | * | 11/2007 | Martinez ............ B65D 5/48032 206/703 |
| 2008/0075566 A1 | | 3/2008 | Benedict et al. |
| 2008/0075568 A1 | | 3/2008 | Benedict et al. |
| 2008/0075569 A1 | | 3/2008 | Benedict et al. |
| 2008/0134458 A1 | | 6/2008 | Ziegler et al. |
| 2008/0140255 A1 | | 6/2008 | Ziegler et al. |
| 2008/0155768 A1 | | 7/2008 | Ziegler et al. |
| 2008/0191001 A1 | * | 8/2008 | Chandaria ............. B65D 31/02 229/100 |
| 2008/0213073 A1 | | 9/2008 | Benedict et al. |
| 2010/0139931 A1 | | 6/2010 | Guenthner et al. |
| 2010/0275512 A1 | | 11/2010 | Nien |
| 2011/0027059 A1 | | 2/2011 | Benedict et al. |
| 2011/0173769 A1 | * | 7/2011 | Bloom ...................... B65F 1/10 15/257.9 |
| 2011/0180533 A1 | * | 7/2011 | Hay ........................ B65D 19/18 220/4.28 |
| 2011/0192082 A1 | | 8/2011 | Uchiyama |
| 2011/0271469 A1 | | 11/2011 | Ziegler et al. |
| 2012/0036659 A1 | | 2/2012 | Ziegler et al. |
| 2012/0147558 A1 | | 6/2012 | Dunn, Jr. et al. |
| 2012/0272500 A1 | | 11/2012 | Reuteler |
| 2013/0011226 A1 | | 1/2013 | Camenisch et al. |
| 2013/0171308 A1 | * | 7/2013 | Webster ................. B65D 77/02 426/326 |
| 2014/0026474 A1 | | 1/2014 | Kulas |
| 2014/0069007 A1 | | 3/2014 | Chen et al. |
| 2014/0191633 A1 | | 7/2014 | Zhu |
| 2014/0283452 A1 | | 9/2014 | Dittman |
| 2014/0289992 A1 | | 10/2014 | Ziegler et al. |
| 2015/0045944 A1 | | 2/2015 | Visser et al. |
| 2015/0127143 A1 | * | 5/2015 | Lindbo ................ B65G 1/0464 700/218 |
| 2015/0307276 A1 | * | 10/2015 | Hognaland ............... B66F 9/06 700/218 |
| 2016/0095309 A1 | | 4/2016 | Reuteler |
| 2016/0129587 A1 | | 5/2016 | Lindbo et al. |
| 2016/0140488 A1 | | 5/2016 | Lindbo |
| 2016/0145058 A1 | | 5/2016 | Lindbo |
| 2016/0325932 A1 | * | 11/2016 | Hognaland ............. B60L 15/40 |
| 2017/0106948 A1 | * | 4/2017 | Fitzpatrick .............. B63B 25/14 |
| 2018/0148259 A1 | | 5/2018 | Gravelle et al. |

FOREIGN PATENT DOCUMENTS

| | | | |
|---|---|---|---|
| DE | 2719953 A | | 7/1978 |
| DE | 4439740 C1 | | 5/1996 |
| DE | 20 2005 011 402 U1 | | 10/2005 |
| DE | 102011103443 A1 | | 12/2012 |
| DE | 102012025154 A1 | | 6/2014 |
| EP | 0 767 113 B1 | | 7/2002 |
| EP | 1 037 828 B1 | | 9/2003 |
| EP | 1 700 793 A1 | | 9/2006 |
| EP | 2133289 A1 | | 12/2009 |
| EP | 2308283 A1 | | 4/2011 |
| EP | 2783913 A2 | | 10/2014 |
| EP | 2829210 A2 | | 1/2015 |
| GB | 631676 A | | 11/1949 |
| GB | 1157145 A | | 7/1969 |
| GB | 2 170 471 A | | 8/1986 |
| GB | 2514930 A | | 12/2014 |
| GB | 2518259 A | | 3/2015 |
| GB | 2520104 A | | 5/2015 |
| GB | 2527543 A | | 12/2015 |
| GB | 2528573 A | | 1/2016 |
| GB | 2529029 A | | 2/2016 |
| GB | 2529527 A | | 2/2016 |
| JP | H 09-299496 A | | 11/1997 |
| JP | 2000255786 A | | 9/2000 |
| LU | 88754 A1 | | 10/1996 |
| NO | 317366 B1 | | 10/2004 |
| WO | 92-04713 A1 | | 3/1992 |
| WO | 92/22072 A1 | | 12/1992 |
| WO | WO-9222072 A1 * | | 12/1992 ......... B65D 77/0453 |
| WO | 97-38928 A1 | | 10/1997 |
| WO | 98-49075 A1 | | 11/1998 |
| WO | 03-031285 A1 | | 4/2003 |
| WO | 03-095339 A1 | | 11/2003 |
| WO | 2004-096609 A1 | | 11/2004 |
| WO | 2008108845 A2 | | 9/2008 |
| WO | 2011047710 A1 | | 4/2011 |
| WO | 2013082601 A1 | | 6/2013 |
| WO | 2013147597 A1 | | 10/2013 |
| WO | 2013162192 A1 | | 10/2013 |
| WO | 2013167907 A1 | | 11/2013 |
| WO | 2013169110 A1 | | 11/2013 |
| WO | 2014-090684 A1 | | 6/2014 |
| WO | 2014195901 A1 | | 12/2014 |
| WO | 2014203126 A1 | | 12/2014 |
| WO | 2015-019055 A1 | | 2/2015 |
| WO | 2015105426 A1 | | 7/2015 |

OTHER PUBLICATIONS

British Search Report dated Jun. 16, 2016, by the British Patent Office for Application No. 1602505.8.

International Search Report (PCT/ISA/210) dated Mar. 9, 2017, by the European Patent Office as the International Searching Authority for International Application No. PCT/EP2017/051981.

Written Opinion (PCT/ISA/237) dated Mar. 9, 2017, by the European Patent Office as the International Searching Authority for International Application No. PCT/EP2017/051981.

International Search Report (PCT/ISA/210) dated Jul. 15, 2016, by the European Patent Office as the International Searching Authority for International Application No. PCT/EP2016/058467.

(56) References Cited

OTHER PUBLICATIONS

Written Opinion (PCT/ISA/237) dated Jul. 15, 2016, by the European Patent Office as the International Searching Authority for International Application No. PCT/EP2016/058467.
International Search Report (PCT/ISA/210) dated Jul. 20, 2016, by the European Patent Office as the International Searching Authority for International Application No. PCT/EP2016/058466.
Written Opinion of the International Searching Authority (PCT/ISA/237) dated Jul. 20, 2016, by the European Patent Office as the International Searching Authority for International Application No. PCT/EP2016/058466.
International Search Report (PCT/ISA/210) dated Jul. 14, 2016, by the European Patent Office as the International Searching Authority for International Application No. PCT/EP2016/058407.
Written Opinion of the International Searching Authority (PCT/ISA/237) dated Jul. 18, 2016, by the European Patent Office as the International Searching Authority for International Application No. PCT/EP2016/058407.
International Search Report (PCT/ISA/210) dated Jul. 14, 2016, by the European Patent Office as the International Searching Authority for International Application No. PCT/EP2016/058385.
Written Opinion (PCT/ISA/237) dated Jul. 14, 2016, by the Japanese Patent Office as the International Searching Authority for International Application No. PCT/EP2016/058385.
International Search Report (PCT/ISA/210) dated Jul. 19, 2016, by the European Patent Office as the International Searching Authority for International Application No. PCT/EP2016/058384.
Written Opinion (PCT/ISA/237) dated Jul. 19, 2016, by the European Patent Office as the International Searching Authority for International Application No. PCT/EP2016/058384.
International Search Report (PCT/ISA/210) dated Jul. 18, 2016, by the European Patent Office as the International Searching Authority for International Application No. PCT/EP2016/058381.
Written Opinion (PCT/ISA/237) dated Jul. 18, 2016, by the European Patent Office as the International Searching Authority for International Application No. PCT/EP2016/058381.
International Search Report (PCT/ISA/210) dated Aug. 30, 2016, by the European Patent Office as the International Searching Authority for International Application No. PCT/EP2016/058366.
Written Opinion (PCT/ISA/237) dated Aug. 30, 2016, by the European Patent Office as the International Searching Authority for International Application No. PCT/EP2016/058366.
International Search Report (PCT/ISA/210) dated Jul. 18, 2016, by the European Patent Office as the International Searching Authority for International Application No. PCT/EP2016/058405.
Written Opinion (PCT/ISA/237) dated Jul. 14, 2016, by the European Patent Office as the International Searching Authority for International Application No. PCT/EP2016/058405.
Search Report dated Dec. 22, 2016, by the European Patent Office for Application No. 1606679.7.
Search Report dated Dec. 21, 2016, by the European Patent Office for Application No. 1606677.1.
Search Report dated Mar. 8, 2016, by the European Patent Office for Application No. 1518089.6.
Office Action (Communication) dated Nov. 25, 2020, by the European Patent Office in corresponding European Patent Application No. 17702604.4. (8 pages).

* cited by examiner

STORAGE SYSTEMS, METHODS AND CONTAINERS

The present invention relates to storage systems methods and containers. More specifically but not exclusively, it relates to storage systems having storage bins or containers in stacks.

Some commercial and industrial activities require systems that enable the storage and retrieval of a large number of different products. One known type of system for the storage and retrieval of items in multiple product lines involves arranging storage containers or containers in stacks on top of one another, the stacks being arranged in rows. The storage containers or containers are accessed from above, removing the need for aisles between the rows and allowing more containers to be stored in a given space.

Methods of handling containers stacked in rows have been well known for decades. In some such systems, for example as described in U.S. Pat. No. 2,701,065, to Bertel comprise freestanding stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Other forms of robotic load handling device are further described in, for example, Norwegian patent number 317366, the contents of which are incorporated herein by reference. FIGS. 3(a) and 3(b) are schematic perspective views of a load handling device from the rear and front, respectively, and FIG. 3(c) is a schematic front perspective view of a load handling device lifting a bin.

A further development of load handling device is described in UK Patent Application No 1314313.6 (Ocado) where each robotic load handler only covers one grid space, thus allowing higher density of load handlers and thus higher throughput of a given size system.

In such known storage systems a large number of containers are stacked densely. The contents of the containers may contain ignitable or inflammable products, items or goods such as matches, aerosols or solvents and the increased packing density of the containers may pose a fire risk.

According to the invention there is provided a storage system comprising: a first set of parallel rails or tracks and a second set of parallel rails or tracks extending transversely to the first set in a substantially horizontal plane to form a grid pattern comprising a plurality of grid spaces; a plurality of storage containers arranged in stacks, located beneath the rails and; at least one load handling device disposed on the grid, arranged to move laterally above the stacks on the rails, the load handling device comprising a lifting device arranged to lift one or more containers from a stack; wherein a number of the containers 10 comprise liner means the liner means acting so as to protect the storage system from items 28 contained within the container that may pose a safety risk.

According to the invention there is further provided a method of storing inflammable materials in a storage system, the storage system comprising a first set of parallel rails or tracks and a second set of parallel rails or tracks extending transversely to the first set in a substantially horizontal plane to form a grid pattern comprising a plurality of grid spaces; a plurality of storage containers arranged in stacks, located beneath the rails and; at least one load handling device disposed on the grid, arranged to move laterally above the stacks on the rails, the load handling device comprising a lifting device arranged to lift one or more containers from a stack; comprising the steps of: lining at least one container with flame retardant liner means; and loading inflammable items in a container comprising said liner such that inflammable items stored within the container are not in direct contact therewith.

According to the invention there is further provided a container for use in a grid based storage system in which the container comprises liner means, the liner means comprising flame retardant or flame suppressant material, in which the storage system forms part of a fulfillment system of an online retail organisation.

In this way, ignitable or inflammable goods may be more safely stored in containers in more densely packed storage systems.

In this way, the present invention overcomes the problems of the prior art and provides a system and method of increasing the reliability and reducing the overall cost of large bin handling storage systems.

The invention will now be described with reference to the accompanying diagrammatic drawings in which.

Figure 5:
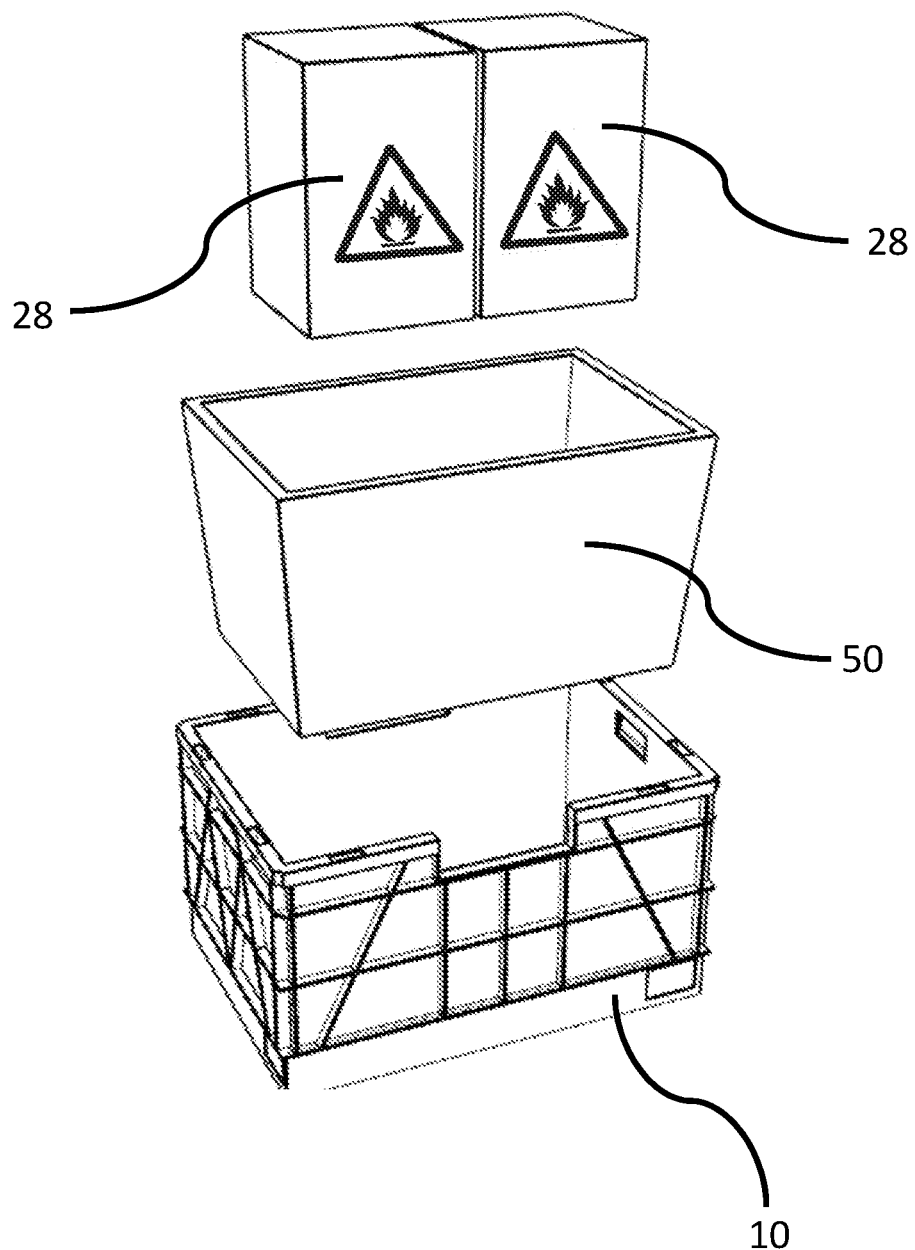
FIG. 5 is a schematic perspective exploded view of a container for storing inflammable inventory items such as matches, firelighters and lighter fluid in accordance with one form of the invention, the container comprising a liner sized so as to releasably conform to the inner surface of the container.
Figure 6:
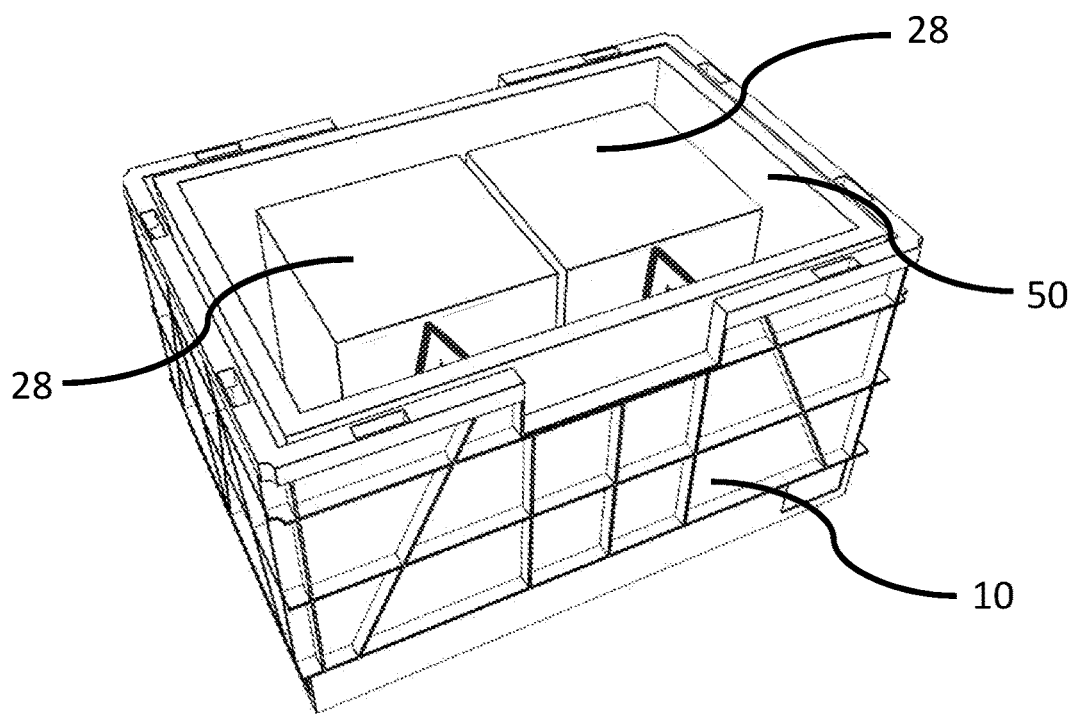
Figure 7:
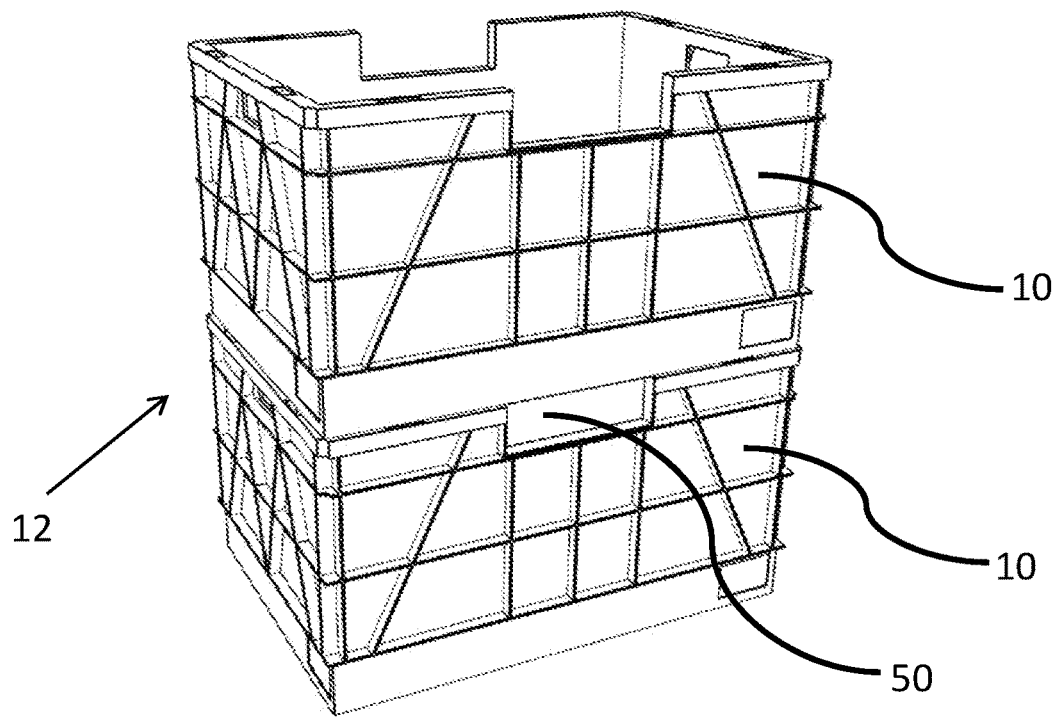

FIG. 6 is a schematic perspective view of the container of FIG. 5 showing the liner in situ within the container, the inflammable items being located in the liner within the container; and FIG. 7 is a schematic perspective view of the container of FIG. 6 with a further container located thereon, the upper container acting so as to form a lid on the container of FIGS. 5 and 6, containing the inflammable items and acting so as to enable the containers 10 to be stacked.

Figure 1:
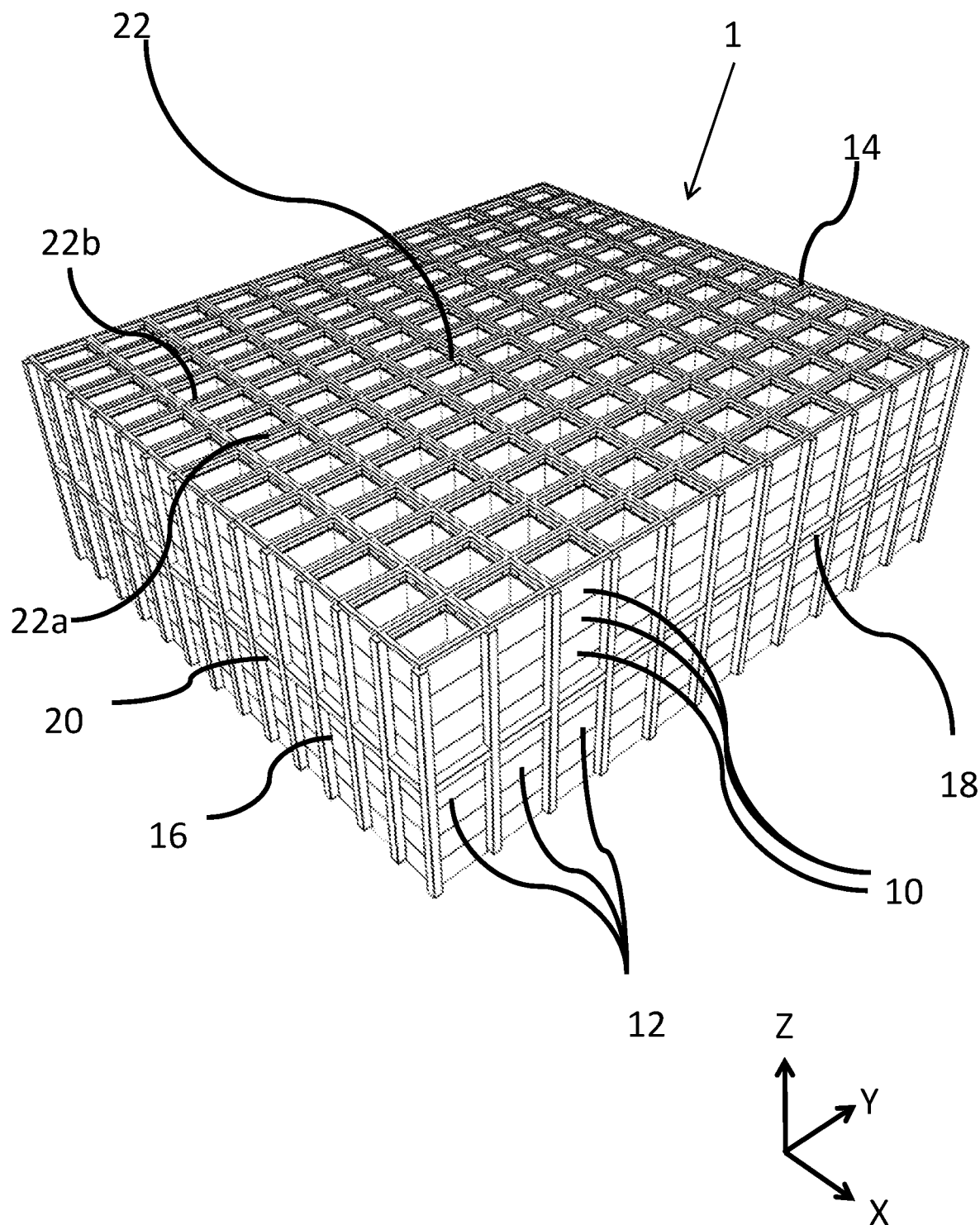
FIG. 1 is a schematic perspective view of a frame structure for housing a plurality of stacks of containers in a storage system.
Figure 2:
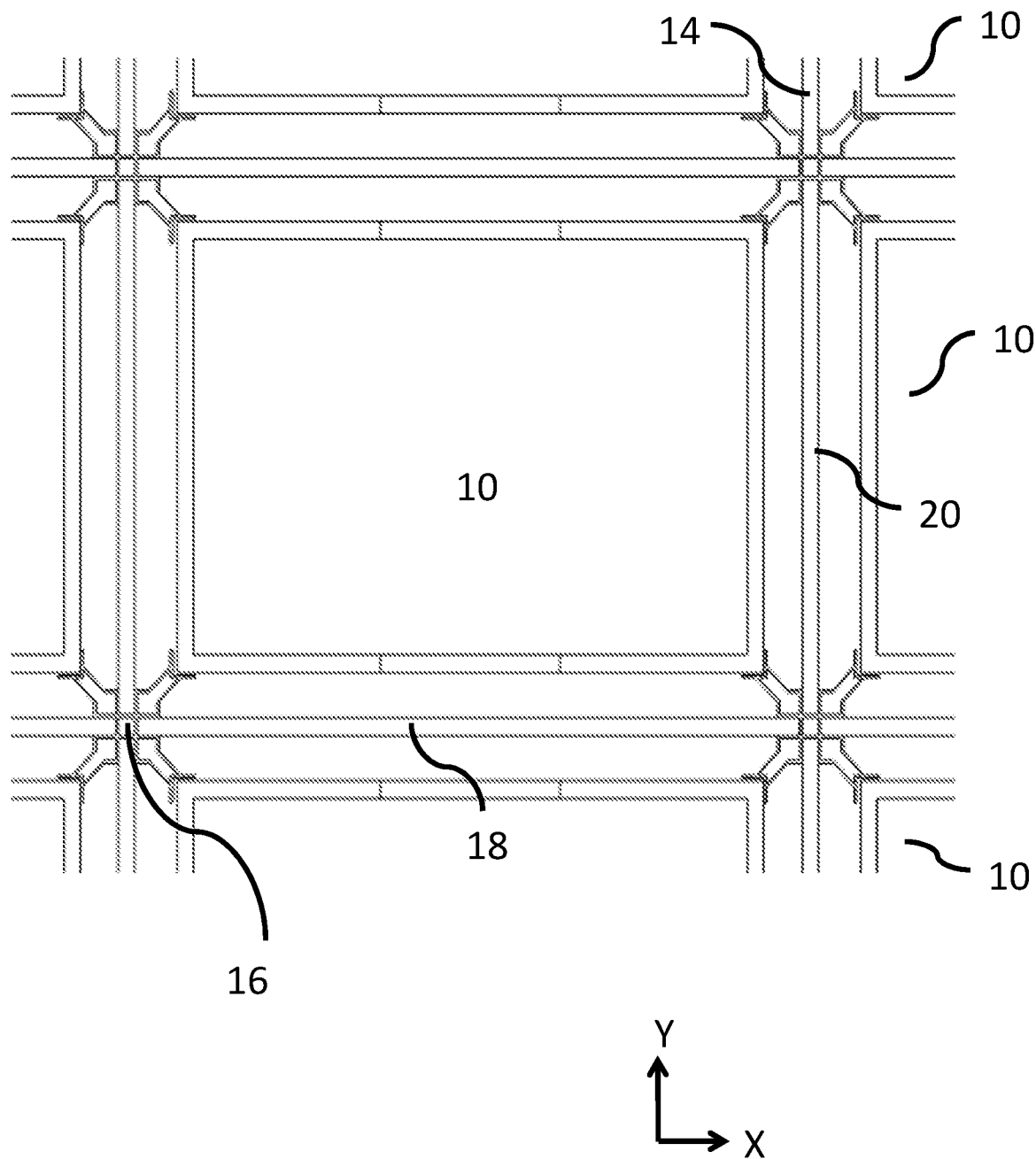
FIG. 2 is a schematic plan view of part of the frame structure of FIG. 1.

As shown in FIGS. 1 and 2, stackable bins, known as containers 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of containers 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The containers 10 are stacked between the members 16, 18, 20 of the frame structure 14, so that the frame structure 14 guards against horizontal movement of the stacks 12 of containers 10, and guides vertical movement of the containers 10.

Figure 3A:
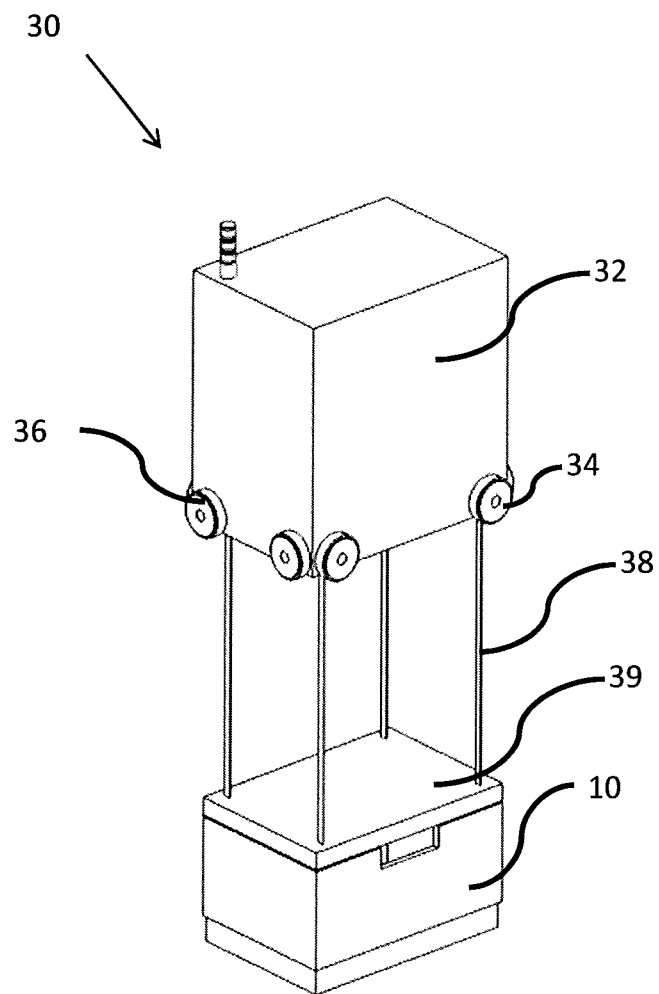
FIGS. 3A and 3B are schematic perspective views, from the rear and front respectively, of one form of robotic load handling device for use with the frame structure of FIGS. 1 and 2.
Figures 3B, 3C:
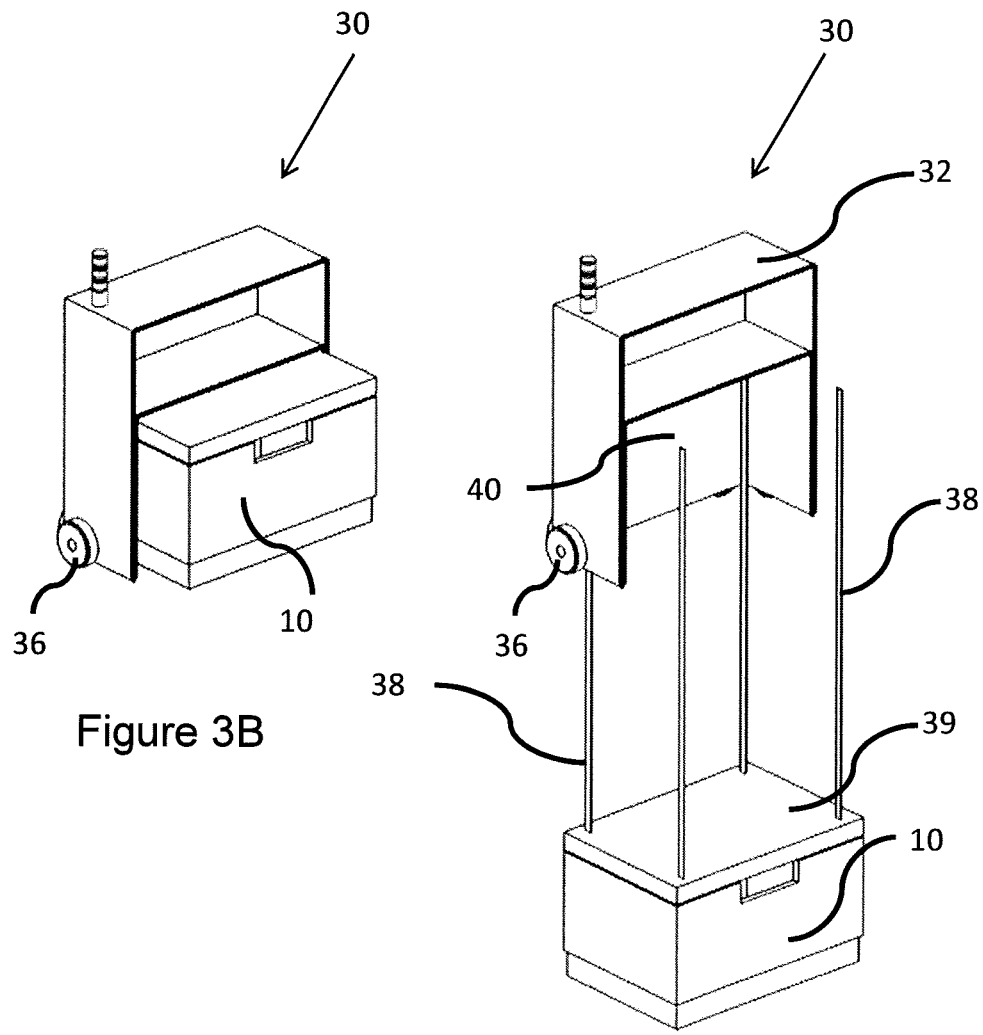
FIG. 3C is a schematic perspective view of the known load handler device in use lifting a bin.
Figure 4:
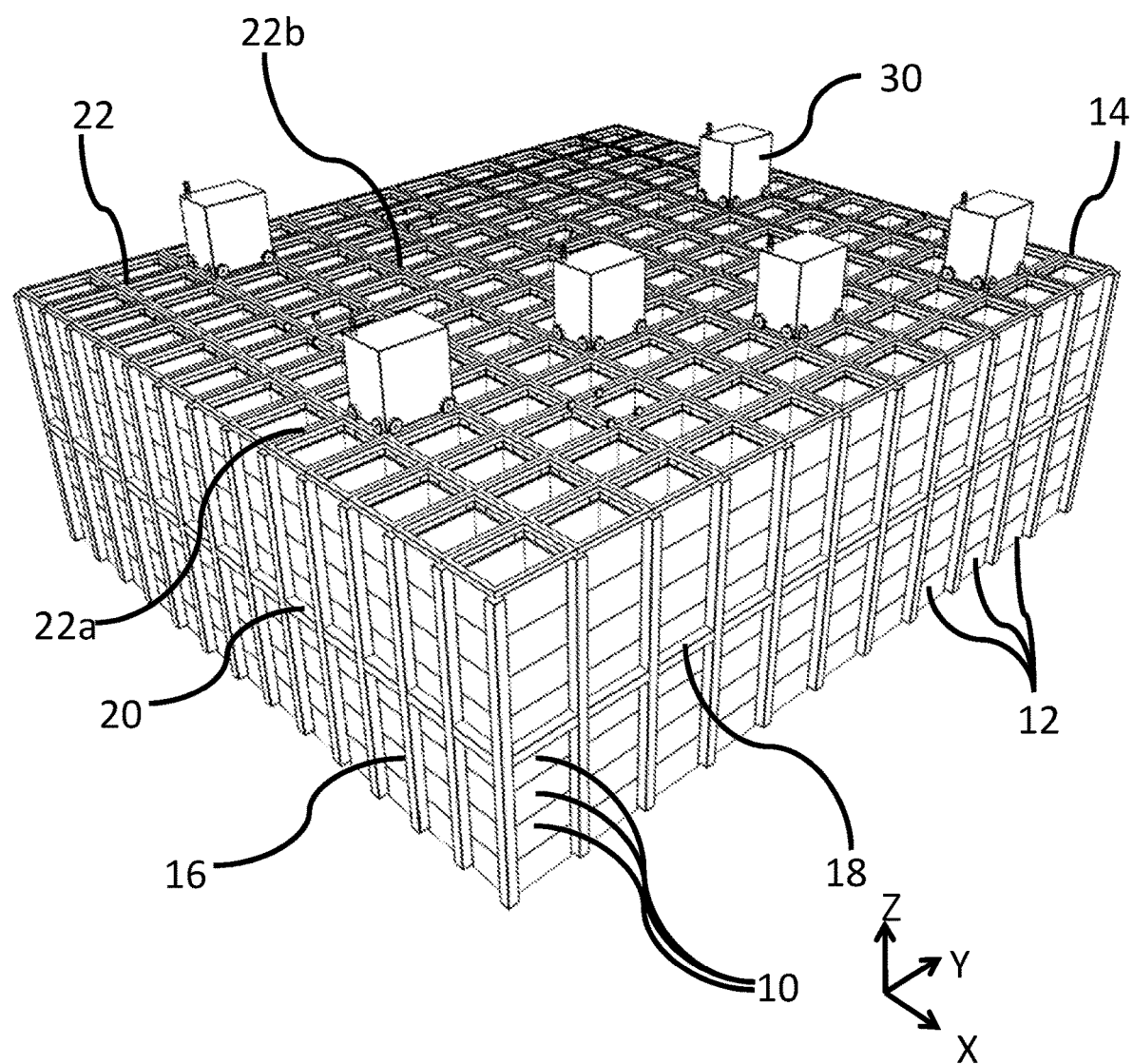
FIG. 4 is a schematic perspective view of a known storage system comprising a plurality of load handler devices of the type shown in FIGS. 3A, 3B and 3C, installed on the frame structure of FIGS. 1 and 2.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12. It will be appreciated that the first 22a and second 22b set of tracks comprise double tracks that allow robotic load handling devices 30 to pass each other whilst over adjacent grid squares.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more containers or containers from the stack to access the required products. In this way, multiple products can be accessed from multiple locations in the grid and stacks at any one time.

FIG. 4 shows stacks 12 of containers 10 located within the framework structure 14, the containers 10 being held in stacks 12 by co-operating surfaces of the containers 10 forming interference fits between adjacent containers 10 in the stack 12. Furthermore, FIG. 4 shows a typical storage system as described above, the system having a plurality of load handling devices 30 active on the tracks 22 above the stacks 12 of containers 10.

It will be appreciated that there may be a large number of containers in any given storage system and that many different goods may be stored in the stacks, each container may contain different goods within a single stack. Such dense packing of products and items in containers may pose a fire risk particularly if some of the items are inflammable or ignitable such as matches, nail varnish remover, other solvents, charcoal, aerosols or other materials or fluids in pressurised cans. It will be appreciated that these are merely examples of ignitable or inflammable products that may need to be stored safely in the storage system and that the invention envisages any type of inflammable, ignitable or flammable product may be stored as described below.

FIG. 5 shows a liner 50 for a container 10 in accordance with one form of the invention. The liner 50 is formed from a suitable material such as metal or a flame retardant plastics material. A metal liner 50 may be formed from aluminium or aluminium alloys or from mild steel or any other suitable metal. A flame retardant plastics liner 50 may be formed from PVC or a glass loaded polymer with suitable flame retardant properties. It will be appreciated that these are examples only and that the liner 50 may be formed from any suitable flame retardant material.

The liner 50 is formed so as to conform to the inner surface of the container 10. The liner 50 is formed so as to be removable from the container 10 either manually or robotically. The liner 50 is shaped such that the ability of the containers 10 to be stacked is not inhibited.

In this way, containers 10 comprising liners 50 may be stored in the storage system described above with reference to FIGS. 1 to 4. Accordingly when inflammable items 28 are required to be stored in the storage system, a container 10 having a liner 50 may be used.

Preferably, any container 10 comprising a liner 50 and an inflammable product or products 28 is stored in a position within a stack 12 such that there is a further container 10 above the lined container 10, the base of the container 10 immediately above the lined container forming a lid over the inflammable items 28 held within the liner 50 in the container 10.

When inflammable items 28 for storage in the system are received at the input of the storage system (not shown), the items 28 are loaded in to a container 10 comprising a liner 50. This loading may occur manually or robotically. Alternatively, a load handling device 30 may act to collect a container 10 comprising a liner 50 from the one of the stacks 12 of the storage system. Such a stored, lined container, which may already contain inflammable items 28 of the same or different type as those to be stored in the system, or which may be empty, is transported to an appropriate goods inward of the storage system and the products 28 placed in the lined container.

After the items 28 are placed in the liner 50 in the container 10, a load handling device 30 transports the loaded container 10 to an appropriate position and places the container 10 in a stack 12 within the storage system.

When a customer order requires an inflammable product 28, the container 10 comprising the liner 50 is removed from the relevant stack 12 and transported to a pick station (not shown) where the requisite item or items 28 are removed from the container and added to the customer order. The customer order may include one or more inflammable items and may include further items such as fresh produce or other non-food items. The customer order is preferably packed in to a delivery container in preparation for onward transmission to a delivery vehicle for delivery to the customer. The order packing may be manual or automatic and may occur on the grid or at a pick station (not shown). The delivery container may comprise a container comprising bags, boxes or further liners or any other suitable delivery packaging. The delivery container may be temporarily returned to the storage system to await onward transmission to a delivery vehicle.

In another method of picking inflammable items 28 from the storage system, a load handling device 30 may collect a container 10 comprising inflammable items and transport it to a first pick station for a first item 28 to be removed and added to a customer order. A load handling device 30 may then transport the same container 10 to a further pick station (not shown) to fulfil a further customer order and this may continue until such a time that the container 10 comprising the liner 50 no longer comprises any inflammable items 28 or until no further customer orders require inflammable or ignitable items 28 from the given container 10.

It will be appreciated that if the container 10 no longer contains inflammable or ignitable item then it may be returned to the goods inward portion of the storage system for refilling or it may be returned in to a stack 12 until it is required. Furthermore, it will be appreciated that the liner 50 may be removed at an appropriate position on the grid and the container 10 used to store products and items not requiring a liner 50.

It will be appreciated that in any given storage system there may be a number of containers 10 comprising liners 50 that are used to store ignitable or inflammable products 28. Furthermore, multiples of the same product 28 may be stored in a given lined container 10. Alternatively, a plurality of different products 28 may be stored in a given lined container 10. In a further form of the invention, a container 10 may comprise two or more liners 50 acting so as to sub-divide the container in to two or more separate portions thereby enabling different products 28 to be separated within a single container 10.

It will further be appreciated that multiple containers 10 comprising liners 50 may be stacked in a given stack 12, a single stack 12 may comprise only containers 10 comprising liners 50, a plurality of stacks 12 may comprise only one lined container and some stacks 12 may not comprise any lined containers.

Furthermore, the liner means 50 described above are removable from the containers 10. However, it will be appreciated that the liner means may be fixedly attached to the interior surface of the container 10 or the liner means 50 may comprise a coating on the internal surface of the container 10.

Moreover, the embodiments described above and detailed in the accompanying figures assume that the storage system comprises containers 10 in stacks 12 disposed within a framework 14 in an unfettered manner. It will be appreciated that the system may be partitioned by suitable partitioning means into smaller sub sections for example for safety reasons.

It will also be appreciated that the partitioning may have additional advantages, for example, partitioning enables sections of the storage system to be isolated from other sections. This may be necessary if there is a fire, for example, and fire suppressant means are used in a given area to extinguish the fire. Furthermore, in the case where the system is used for alternative uses, there may be advantages in having different gaseous atmospheres in different portions of the system. This may be achieved by partitioning the system. It will be appreciated that the partitioning means may be temporary and remotely deployable, for example roller shutters disposed under the grid.

The partitioning of the storage system enables containers 10 comprising inflammable or ignitable items to be stored separately from containers 10 comprising other items, products or goods.

Many variations and modifications not explicitly described above are also possible without departing from the scope of the invention as defined in the appended claims.

The invention claimed is:

1. A storage system comprising:
a first set of parallel rails or tracks and a second set of parallel rails or tracks extending transversely to the first set in a substantially horizontal plane to form a grid pattern with a plurality of grid spaces;
a plurality of storage containers arranged in stacks, and located beneath the first and second sets of rails;
a partition for separating the storage system into smaller subsections including a first subsection for storing a stack of storage containers of the plurality of storage containers containing inflammable items and a second subsection for storing a stack of storage containers of the plurality of storage containers containing non-inflammable items;
at least one load handling device disposed on the grid, arranged to move laterally above the stacks on the first and second sets of rails, the load handling device having a lifting device configured to lift one or more containers from a stack;
wherein at least one container has a liner, the liner formed of flame retardant materials being configured to protect the storage system from items contained within the container that may pose a safety risk.

2. A storage system according to claim 1, in which the liner comprises:

at least one liner formed so as to substantially conform to an internal surface of the container, the liner being configured to protect the container from products contained therein.

3. A storage system according to claim 1, in which the liner comprises:
two co-operating liners configured to act together to conform substantially to an inside surface of the container.

4. A storage system according to claim 1, in which the liner comprises:
material for preventing spread of fire in an event of a product contained within the container combusting.

5. A storage system according to claim 1, wherein the first subsection includes a fire suppressant system.

6. A storage system according to claim 1, wherein a gaseous atmosphere of the first subsection is different from a gaseous atmosphere of the second subsection.

7. A storage system according to claim 1, in which the liner comprises:
a metal liner.

8. A storage system according to claim 7, in which the metal liner comprises:
aluminium, an aluminium alloy, or steel.

9. A storage system according to claim 1, in which the liner comprises:
a flame retardant plastics or composite liner.

10. A storage system according to claim 9, in which the liner comprises:
PVC or glass reinforced plastics composite material.

11. A method of storing inflammable materials in a storage system, the storage system having a first set of parallel rails or tracks and a second set of parallel rails or tracks extending transversely to the first set in a substantially horizontal plane to form a grid pattern with a plurality of grid spaces, a plurality of storage containers arranged in stacks and located beneath the first and second sets of rails, a partition for separating the storage system into smaller subsections including a first subsection for storing a stack of storage containers of the plurality of storage containers containing inflammable items and a second subsection for storing a stack of storage containers of the plurality of storage containers containing non-inflammable items, and at least one load handling device disposed on the grid, and arranged to move laterally above the stacks on the first and second sets of rails, the load handling device having a lifting device configured to lift one or more containers from a stack, the method comprising:
lining at least one container with a flame retardant liner;
loading inflammable items in the at least one container such that the inflammable items stored within the container will not be in direct contact therewith;
storing the at least one container in a stack in the subsection of the storage system for storing inflammable items until needed.

12. A method according to claim 11, in which the liner has at least one liner formed so as to substantially conform to an internal surface of the container for protecting the container from products contained therein.

13. A method according to claim 11, in which the liner includes two co-operating liners acting together so as to conform substantially to an inside surface of the container.

14. A method according to claim 11, in which the liner includes material for preventing spread of fire in an event of a product contained within the container combusting.

15. A method according to claim 11, wherein the first subsection includes a fire suppressant system.

16. A method according to claim 11, wherein a gaseous atmosphere of the first subsection is different from a gaseous atmosphere of the second subsection.

17. A method according to claim 11, in which the liner includes a metal liner.

18. A method according to claim 17, in which the metal liner is aluminium, an aluminium alloy, or steel.

19. A method according to claim 11, in which the liner is a flame retardant plastics or composite liner.

20. A method according to claim 19, in which the liner includes PVC or glass reinforced plastics composite material.

* * * * *